(12) United States Patent
Nakayoshi et al.

(10) Patent No.: US 6,219,115 B1
(45) Date of Patent: Apr. 17, 2001

(54) LIQUID CRYSTAL DISPLAY DEVICE

(75) Inventors: Yoshiaki Nakayoshi; Kikuo Ono; Masuyuki Ohta; Masahiro Ishii; Nobuyuki Suzuki, all of Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/368,568

(22) Filed: Aug. 5, 1999

(30) Foreign Application Priority Data

Aug. 5, 1998 (JP) .................................................. 10-221264

(51) Int. Cl.$^7$ .................................................... G02F 1/136
(52) U.S. Cl. ........................... 349/43; 349/141; 349/139; 349/152
(58) Field of Search .............................. 349/43, 42, 141, 349/144, 54, 55, 139, 143, 152

(56) References Cited

U.S. PATENT DOCUMENTS 5,414,283 * 5/1995 den Boer et al. ...................... 257/59
5,978,059 * 11/1999 Ohta et al. ............................ 349/141

* cited by examiner

Primary Examiner—William L. Sikes
Assistant Examiner—Quynh-Nhu H. Vu
(74) Attorney, Agent, or Firm—Antonelli, Terry, Stout & Kraus, LLP

(57) ABSTRACT

A liquid crystal display device having suitable structures for avoiding the decline in the yield factor for production thereof by preventing signal lines formed therein from being disconnected. A liquid crystal display device has a pair of substrates confronting one another and being spaced by a liquid crystal layer and at least one first signal line, a first insulating film, at least one second signal line, and a second insulating film being formed above a surface of one of the pair of substrates. The at least one first signal line and the at least one second signal line are arranged so as to cross one another at a crossing region, where the at least one first signal line, the first insulating film, the at least one second signal line, and the second insulating film are disposed in this order from the surface of the one of the pair of the substrates. The second insulating film has a pair of openings piercing therethrough at both sides of the crossing region and a conductive layer is formed thereon. The conductive layer crosses over the at least one first signal line and electrically connected to the at least one second signal line via the pair of openings at both sides of the crossing region.

8 Claims, 7 Drawing Sheets

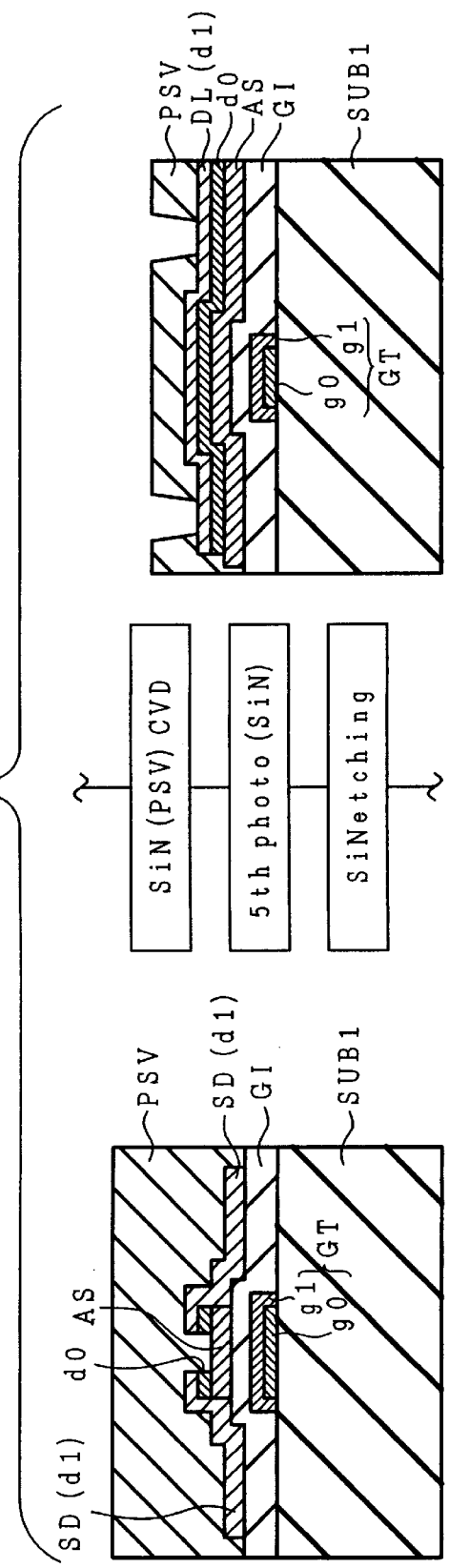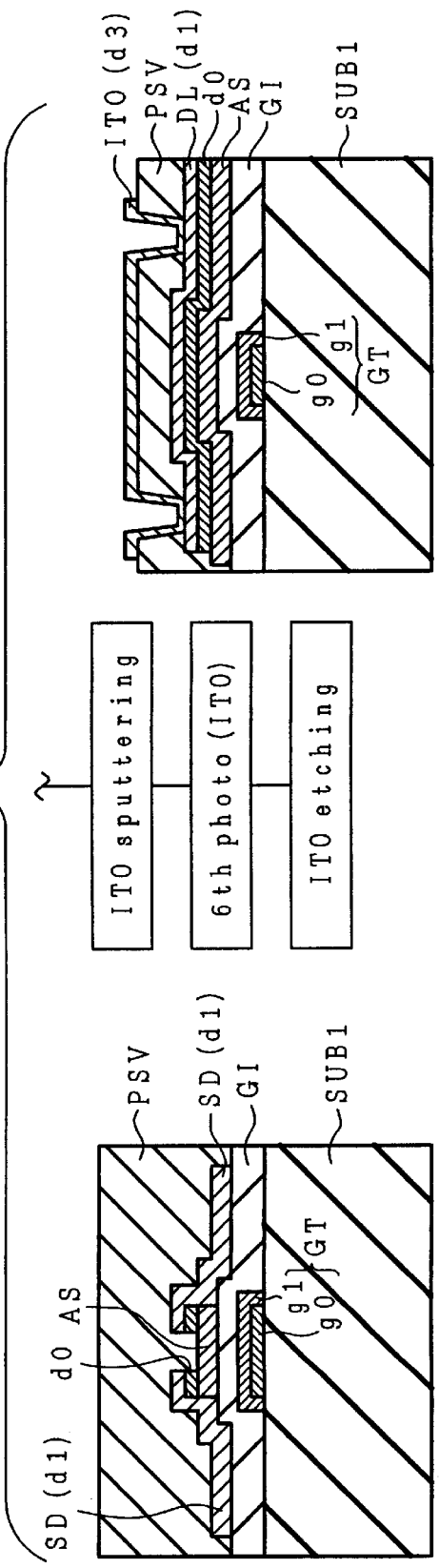

LIQUID CRYSTAL DISPLAY DEVICE

BACKGROUND OF THE INVENTION

The present invention relates to liquid crystal display devices, and, more particularly, to liquid crystal display devices of the lateral electric field type.

A liquid crystal display device of the lateral electric field-driven type comprises a pair of transparent substrates disposed so as to be opposed to each other and to be spaced by a liquid crystal (LC) layer sealed therebetween, and a pixel electrode and a counter electrode spaced apart from the pixel electrode are formed in each of a matrix of pixel regions on a surface at the liquid crystal layer side of one of the pair of transparent substrates. The pixel electrode and the counter electrode disposed at each pixel region generate an electric field therebetween so as to control the optical transmissivity of the liquid crystals disposed in the vicinity of the pixel region. Since the liquid crystal display device of the lateral electric field type generates an electric field having a major component extending substantially parallel to the main surface of the transparent substrate between the pixel electrode and the counter electrode for switching orientations of the liquid crystal molecules, the lateral electric field scheme is also referred to as in "In-Plane-Switching (IPS) scheme".

An active-matrix liquid crystal display device employing the lateral electric field scheme has a plurality of scan signal lines and a plurality of counter voltage signal lines, both of which extend in an "x" direction (row direction), while being juxtaposed in parallel in a "y" (column) direction (transverse to the x direction), and a plurality of video signal lines, which extend in the y direction, while being juxtaposed in the x direction, on the surface at the liquid crystal layer side of the one of the pair of transparent substrates. When the scan signal lines, the counter voltage signal lines and the video signal lines are disposed on a surface of one of the pair of transparent substrates, each of the pixel regions is defined as an area surrounded by one of the scan signal lines, one of the counter voltage signal lines adjacent to the one of the scan signal lines, and a pair of the image signal lines disposed adjacent to one another.

Each of the pixel regions has a switching element, a pixel electrode, and a counter electrode. The switching element operates so as to be turned on by a scanning signal which is supplied by one of the scanning signal lines. The switching element, when turned on, supplies a video signal, which is being transmitted by one of the video signal lines thereto, to the pixel electrode in the pixel region. A counter voltage for generating a potential difference between the counter electrode and the pixel electrode in the pixel region is transmitted through one of the counter voltage signal lines and is applied to the counter electrode.

A liquid crystal display device having the structure described above is characterized by an image having a higher contrast ratio and a remarkably wider viewing angle. The lateral electric field-type liquid crystal display device is described in detail in such documents as Japanese Patent Application Laid Open Hei 05-505247 (No. 505247/1993), Japanese Patent Publication Sho 63-021907 (No. 021907/1988), and Japanese Patent Application Laid Open Hei 06-160878 (No. 160878/1994).

According to a recent trend toward widening the screen size of a liquid crystal display device, the wiring resistance of each of the signal lines in the liquid crystal display device is required to be lower. However, in complying such a requirement, a decline in the yield factor for production of the liquid crystal display device due to the signal line being disconnected (open circuit) has been experienced.

In seeking a cause of such disconnection of the signal lines, the inventors have found that this problem results from the configuration (of a laminated structure) of the liquid crystal display device, in which a portion (crossing portion, hereinafter) where one of the video signal lines crosses over one of the scanning signal lines is spaced from the one of the video signal lines by an insulating film. More specifically, when the liquid crystal display device has a laminated structure including a conductive layer forming the scanning signal line (a first conductive layer, hereinafter), an insulating film, and another conductive layer forming the video signal line (a second conductive layer, hereinafter) being stacked on (over) one of the pair of transparent substrates in this order, a bump due to the thickness of the first conductive layer appears on an upper surface of the insulating film in the area of the crossing portion. Both the first and the second conductive layers are formed of thin films of such material as a metal, an alloy, an oxide conductor, and the like, and the second conductive layer tends to be fabricated so as to be thinner than the insulating film. Although the first conductive layer is thinner than the insulating film, the bump becomes so much higher (thicker) on the upper surface of the insulating film that the second conductive film being formed on the upper surface of the insulating film is broken by the bump at the crossing portion, and the video signal line becomes disconnected. Even if the scanning signal line is formed of the second conductive film and the video signal line is formed of the first conductive film, the same problem also occurs at the crossing portion, with the scanning signal line being disconnected in this case.

On the other hand, after the video signal lines are formed, another insulating film called a protective film is formed so as to cover even the video signal line. Since the second conductive film of the video signal line is disposed over the first conductive film of the scanning signal line in the crossing portion, another bump appears on the upper surface of the second conductive film (the video signal line). The inventors have found that the protective film PSV is cracked by this other bump so that the second conductive film of the video signal line is eroded by the chemicals (reagent chemicals, solvent, etc.) used for the process of fabrication of the liquid crystal display device, infiltrating through the crack to the second conductive film. This erosion problem also occurs when the scanning signal line is formed of the second conductive film and the video signal line is formed of the first conductive film.

SUMMARY OF THE INVENTION

The present invention has been made in view of the technical background mentioned above, and an object of the invention is to provide an improved liquid crystal display device having suitable structures for avoiding the decline in the yield factor for production thereof by preventing signal lines thereof from becoming disconnected.

Some representative aspects and features of the present invention as disclosed herein will be briefly summarized.

The present invention provides a liquid crystal display device comprising: a pair of substrates confronting one another and being spaced by a liquid crystal layer sealed therebetween; and at least one first signal line, a first insulating film, at least one second signal line, and a second insulating film are formed above a surface of one of the pair of substrates which confronts the liquid crystal layer. The display device is characterized in that: (1) the at least one first signal line extends along a first direction, (2) the at least one second signal line extends along a second direction transverse to the first direction and crosses over the at least one first signal line at a crossing region, where the at least one first signal line, the first insulating film, the at least one second signal line, and the second insulating film are disposed in this order from the surface of the one of the pair of the substrates, (3) the second insulating film has a pair of openings piercing therethrough and a conductive layer being formed thereon, (4) the pair of openings are formed at both sides of the crossing region, and (5) the conductive layer crosses over the at least one first signal line and is electrically connected to the at least one second signal line via the pair of openings at both sides of the crossing region.

In view of the fabrication steps for manufacture of the liquid crystal display device defined above, the at least one first signal line, the first insulating film, the at least one second signal line, and the second insulating film are formed above the surface of the one of the pair of substrates (called "a matrix substrate") sequentially in this order. It goes without saying that these signal lines and these insulating films may be stacked on the surface directly, and an additional layer may be interleaved therebetween. The at least one first signal line may be multiplied, as well as the at least one second signal line. For instance, these signal lines are fabricated to have a stripe shape extending along predetermined directions. On the other hand, the first insulating film and the second insulating film are formed so as to cover most of a so-called matrix area other than opening portions like the pair of openings described above. The opening portions are called "a through hole" or "a contact hole", also. The conductive layer described above may be utilized for an additional signal line to the at least one second signal line.

According to the liquid crystal display device thus arranged, even if the at least one second signal line (the second signal line, hereinafter) is disconnected, the conductive layer connected thereto compensates the signal transmission thereof so that the production yield of the liquid crystal display device is improved.

In this case, whether a disconnection of the second signal line is caused by either a step formed due to the at least one first signal line (the first signal line, hereinafter) or a crevice of the second insulating film (for instance, being utilized for a protective film), the disconnecting portions tend to appear in a similar area, namely at the crossing portion described above (an area where the second signal line crosses over the first signal line). Therefore, there is a strong probability that the conductive layer will compensate the disconnection of the second signal line.

The present invention also encompasses another liquid crystal display device based on that mentioned above, and this other liquid crystal display device further comprises a terminal for supplying a signal to one of the first signal line and the second signal line, characterized in that both the terminal and the conductive layer are formed of Indium-Tin-Oxide.

The terminal is utilized for receiving a signal or a voltage supplied from an external circuit and for supplying it to either the first signal line or the second signal line. It goes without saying that the terminal may be disposed on each of the first signal line and the second signal line, respectively.

With this other liquid crystal display device so arranged, the conductive layer is fabricated without any additional process therefor, and thus an increase in the number of the processing and fabricating steps for producing a liquid crystal display device is avoidable.

These and other objects, features and advantages of the present invention will become more apparent from the following description when taken in conjunction with the accompanying drawings.

BRIEF DESCRIPTION OF THE DRAWINGS

FIGS. 7A–7G comprise a process flow diagram showing cross sectional images related to the sequential step of the fabrication process of the liquid crystal display device according to the present invention.

DETAILED DESCRIPTION

Figure 1:
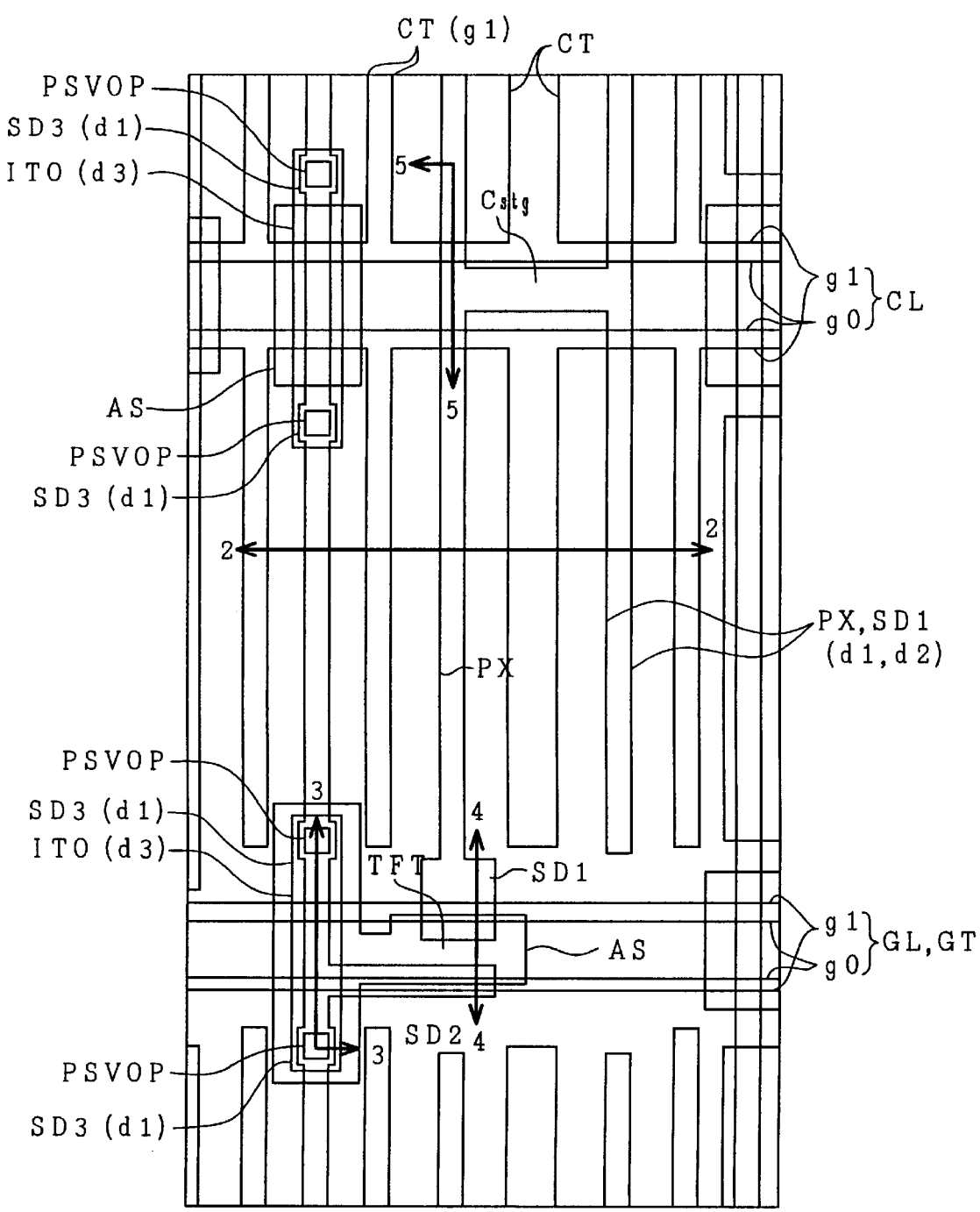
FIG. 1 is a plane view of a typical pixel and its periphery in an active matrix type liquid crystal display device according to the present invention.

Other objects and features of the present invention will be specified in the following description and illustrated in the drawings.

Active Matrix Type Liquid Crystal Display

An example of the present invention as applied to a liquid crystal display device of the active matrix type will be explained hereinafter. In the drawings being referred to in the following descriptions, elements having the same function are identified by the same reference designation, and repetitions of the designations of such elements will be omitted.

FIG. 1 shows a plane view of a typical pixel and its periphery in a color liquid crystal display device of the active matrix type according to the present invention.

As FIG. 1 shows, each of the pixels is arranged in an area enclosed by a scanning signal line (called "gate signal line", or "horizontal signal line", also) GL, a counter voltage signal line (a wiring layer for a counter electrode, described later) CL extending in the direction of the scanning signal line adjacent thereto, and a pair of video signal lines (also called "drain signal lines", "image signal lines", "data lines", or "vertical signal lines") DL disposed adjacent to one another and crossing both the scanning signal line and the counter voltage signal line. Each pixel includes a thin-film transistor TFT, a storage capacity (capacitor) Cstg, a pixel electrode PX, and a counter electrode CT. A plurality of the scanning signal lines GL and a plurality of the counter voltage signal lines CL extend from side to side (in a horizontal direction) and are juxtaposed above and below (in a vertical direction) alternately in FIG. 1. A plurality of the video signal lines DL extend above and below (in the vertical direction) and are juxtaposed from side to side (in a horizontal direction) in FIG. 1. The pixel electrode PX is electrically connected to the thin-film transistor TFT, and the counter electrode CT is integrated with the counter voltage signal line CL.

The pixel electrode PX and the counter electrode CT confront with one another, and they function to control optical conditions of the liquid crystal layer LC by generating an electric field therebetween so as to control a display produced by the liquid crystal display device of the active matrix type. Both the pixel electrode and the counter electrode have a so-called comb-teeth shape which comprises a plurality of narrow electrodes extending above and below and juxtaposed from side to side in FIG. 1.

In this example, the scanning signal line GL and the counter voltage signal line CL (the counter electrode CT) are formed on the same level (a first plane), and the video signal line DL (the pixel electrode PX) is formed on another level (a second plane) spaced from the scanning signal line GL and the counter voltage signal line CL by an insulating film GI.

The video signal line DL is covered by a protective film PSV, on an upper surface of which a conductive layer d3 is formed so as to overlap a portion of the video signal line DL crossing the scanning signal line GL, to extend to either side of the portion along the video signal line DL, and to be connected electrically to the video signal line DL via one of the through holes PSVOP formed in the protective film PSV at either side of the crossing portion. In other words, the video signal line DL has an additional branch line thereto at the crossing portion thereof with the scanning signal line GL, and the branch line bridges over the scanning signal line GL.

Cross-sectional Structure of a Matrix (a Pixel Portion)

Figure 2:
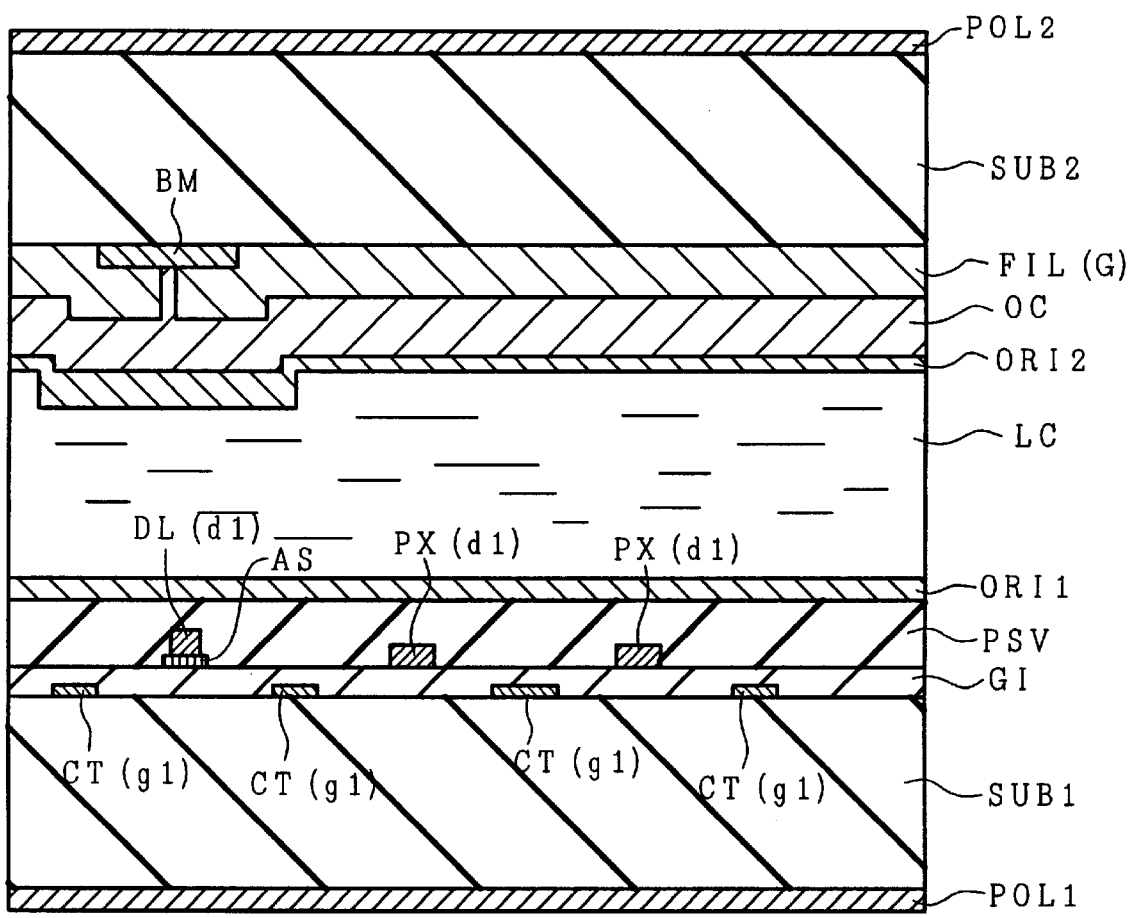
FIG. 2 is a cross section of the pixel taken along a line 2—2 of FIG. 1.
Figure 3:
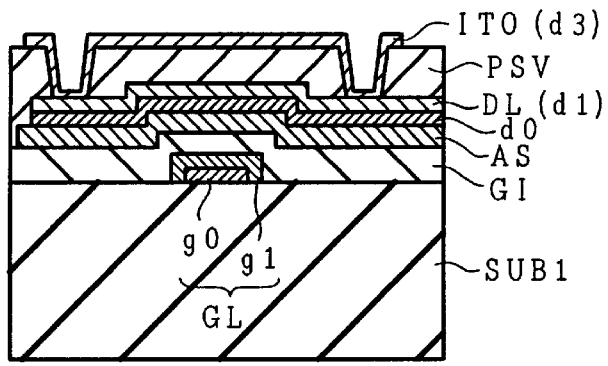
FIG. 3 is a cross section of the crossing portion of the video signal line and the scanning signal line taken along a line 3—3 of FIG. 1.
Figure 4:
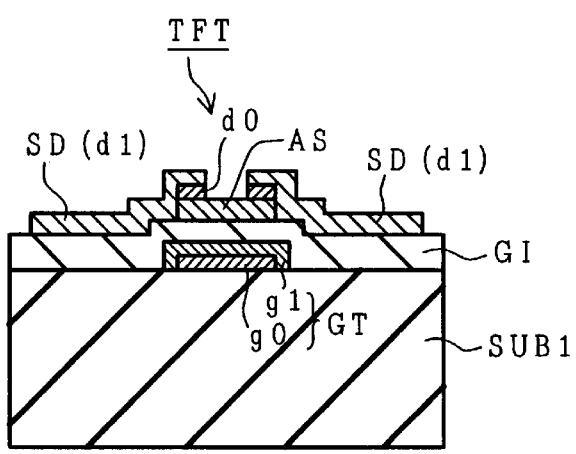
FIG. 4 is a cross section of the thin-film transistor TFT taken along a line 4—4 of FIG. 1.
Figure 5:
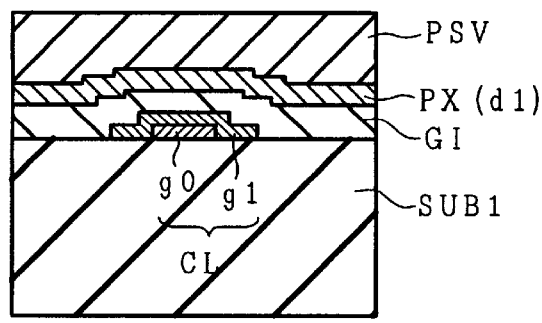
FIG. 5 is a cross section of the storage capacity (capacitor) Cstg taken along a line 5—5 of FIG. 1.

FIG. 2 shows a cross section taken along a line 2—2 of FIG. 1; FIG. 3 shows another cross section taken along a line 3—3 of FIG. 1; FIG. 4 shows a cross section of the thin-film transistor TFT taken along a line 4—4 of FIG. 1; and FIG. 5 shows a cross section of the storage capacity (capacitor) Cstg taken along a line 5—5 of FIG. 1. FIGS. 3–5 shows cross sections limited to laminated structures formed on a liquid crystal display-side surface of the lower transparent glass substrate SUB1. As shown in FIGS. 2–5, a lower transparent glass substrate SUB1 arranged below the liquid crystal layer LC has the thin-film transistors TFT and the storage capacities Cstg formed thereon, and a upper transparent glass substrate SUB2 arranged above the liquid crystal layer LC has color filters FIL and a black matrix pattern BM for shielding light.

On each inner surface (facing the liquid crystal layer LC) of the transparent glass substrates SUB1 and SUB2, an alignment film OR1 or OR2 is formed for regulating initial orientations of liquid crystal molecules in the liquid crystal layer LC. On the other hand, a polarizer POL1 or POL2 is formed on each outer surface (at an opposite side to the liquid crystal layer LC) of the transparent glass substrates SUB1 and SUB2, and both the polarizer POL1 and the polarizer POL2 are arranged so that the polarization axes thereof cross at a right angle to one another (i.e. in the cross Nicols or the cross prism arrangement).

Thin-Film Transistor TFT

The thin-film transistor operates to reduce the channel resistance thereof when a positive bias is applied thereto and to increase the channel resistance thereof when the positive bias being applied thereto is reduced (towards a zero bias).

As shown in FIG. 4, the thin-film transistor TFT has a gate electrode GT, a gate insulating film GI, an i-type semiconductor layer (i.e. an intrinsic semiconductor layer, to which any impurities determining a conductive type thereof are not doped intentionally) AS of i-type amorphous silicon (Si), and a pair of electrodes including a source electrode SD1 and a drain electrode SD2. The source and drain electrodes are determined intrinsically with respect to the duration of a bias being applied therebetween, and therefore the relationship between the source and drain electrodes should be understood to be inverted during the operation of the thin-film transistor. However, the expression designating one electrode as a source electrode and another thereof as a drain electrode will be fixed in any event in the following description, for convenience of description.

Gate Electrode GT

The gate electrode GT is formed continuously together with the scanning signal line GL so that a partial region of the scanning signal line GL is formed as the gate electrode GT. The gate electrode GT is formed as a portion of the scanning signal line GL which exceeds an active region of the thin-film transistor TFT and is so much broader than the i-type semiconductor layer AS as to cover the i-type semiconductor layer AS entirely (as seen from a lower side thereof).

Therefore, the gate electrode GT functions not only as a gate electrode of the thin-film transistor TFT, but also as a light shielding layer which prevents the i-type semiconductor layer AS from being irradiated by light coming from either the outside of the liquid crystal display device or from a back light unit of the liquid crystal display device. In this example, the gate electrode GT is formed of a pair of conductive films, one (g1) of which is formed so as to cover another thereof g0. The laminated structure of these conductive films g0 and g1 comprises for example, an Al-layer for g0 and a Cr-layer for g1 each of which is formed by a sputtering process. The gate electrode may be formed of a single layer of e.g. Cr (materials having high conductivity and being less erosive than Al), or one of the above-mentioned laminated conductive films utilized for the scanning signal line GL, also. In the latter case, one of the laminated conductive films should be extended out therefrom.

Scanning Signal Line GL

In this example, the scanning signal line GL is formed of the laminated conductive films g0 and g1 fabricated by the same process as that used in forming the gate electrode GT, and is integrated with the gate electrode GT. The scanning signal line GL may be formed of a single conductive film g1, also. The scanning signal line GL supplies a gate voltage Vg from an external circuit to the gate electrode GT.

The counter electrode CT is formed of a conductive film g1 on the same level on which the gate electrode GT and the scanning signal line GL are formed. The counter electrode CT also may be fabricated so as to cross its portions with one another. The counter electrode CT is formed so that a counter voltage Vcom is applied thereto. In this example, the counter voltage Vcom is set at a lower voltage than the mean direct potential of a driving voltage applied to a video signal line DL between a minimum level $Vd_{min}$ thereof and a maximum level $Vd_{max}$ thereof by a feedthrough voltage of $\Delta Vs$ appearing when the thin-film transistor TFT is turned off. However, an alternating voltage should be applied to the counter electrode CT for reducing the supply voltage to the integrated circuits utilized in a video signal driving circuit nearly by half.

Counter Voltage Signal Ling CL

The counter voltage signal line CL comprises a laminated structure of conductive films g0 and g1, in this example. The laminated structure is fabricated by the same process as that for the laminated structure of the gate electrode GT and the scanning signal line GL. The conductive film g1 of the counter voltage signal line CL is fabricated by the same process as that for the counter electrode CT (g1) and is integrated therewith. The counter voltage signal line CL may be formed of a single conductive film g1, also. The counter electrode also may be formed of a single conductive film g1 as the gate electrode GT and the scanning signal line GL may be. The counter voltage signal line CL supplies the counter voltage Vcom from an external circuit to the counter electrode CT.

Insulating Film GI

The insulating film GI is utilized as a gate insulating film of the thin-film transistor TFT through which an electric field is applied to the semiconductor layer AS together by the gate electrode GT. The insulating film GI is formed on the gate electrode GT and the scanning signal line GL. In this example, a silicon nitride ($SiN_x$) film formed by a plasma CVD (Chemical Vapor Deposition) process is selected for the materials of the insulating layer GI, and the silicon nitride film is formed to be 1200–2700 Angstrom (Å) (2400 Å for this example). The insulating film GI is formed so as to enclose a matrix region wholly, and a periphery thereof is removed so as to expose the terminals GTM and DTM, which are to be connected to external circuits. The insulating film also contributes to isolation of the scanning signal line GL and the counter voltage signal line CL electrically from the video signal line DL.

i-type Semiconductor Layer AS

The i-type semiconductor layer AS is formed of amorphous silicon and is 200–2200 Å (c.a. 2000 Å, for this example) in thickness. The layer d0 is a semiconductor layer of $N^+$-type amorphous silicon being doped by phosphorus (P) for forming an ohmic contact with the conductive layers SD1 and SD2. The layer d0 remains in a region where the i-type semiconductor (lying thereunder) and one of the conductive layers SD1 and SD2 (lying thereon) overlap one another.

The i-type semiconductor layer AS is also formed in a region where the scanning signal line and one of the counter voltage signal line and the video signal line cross one another, and is interleaved therebetween. The i-type semiconductor layer formed in such a crossing region may be separated from each other and from that being formed below (or over) one of the conductive layers SD1 and SD2. The i-type semiconductor layer being formed in the crossing region prevents the scanning signal line from being short-circuited with the counter voltage signal line and the video signal line.

Source Electrode SD1, Drain Electrode SD2

Each of the source electrode SD1 and the drain electrode SD2 comprises a conductive film d1 contacting the $N^+$-type semiconductor layer d0 (of an amorphous Silicon).

A chromium film formed by a sputtering process is utilized for the conductive film d1, and the conductive film d1 is formed up to 1500–3000 Å (c.a. 3000 Å, for this example) in thickness. As more stress will be put on a chromium film by increasing the thickness thereof, the thickness of the chromium film should remain at 4000 Å or be thinner than 4000 Å. By utilizing a Chromium film for the conductive film d1, sufficient adhesive strength can be obtained at a junction between the conductive film d1 and the $N^+$-type semiconductor layer d0. The conductive film d1 may be formed of at least one of the materials, other than chromium, in a group which consists of refractory metals (Mo, Ti, Ta, W) and silicides (disilicides) thereof ($MoSi_2$, $TiSi_2$, $TaSi_2$, $WSi_2$).

The laminated structure of the i-type semiconductor layer AS, the $N^+$-type semiconductor layer d0, and the conductive film d1 being stacked in this order is fabricated by patterning the conductive film d1 using a mask pattern (by i.e. an optical lithography process), then removing the $N^+$-type semiconductor layer d0 partially with respect to the pattern of the conductive film d1. Therefore, the $N^+$-type semiconductor layer d0 remaining on the i-type semiconductor layer AS, other than a part thereof lying under the conductive film d1, is removed in a self-alignment manner (i.e. with respect to another pattern of the conductive film d1 belonging to the stacked structure itself). While $N^+$-type semiconductor layer d0 is etched away throughout the thickness thereof, the i-type semiconductor layer AS also will be etched around an upper surface thereof. However, a portion of the i-type semiconductor layer AS being etched can be reduced by controlling the etching time (period).

Video Signal Line DL

The video signal line DL is formed of an $N^+$-type semiconductor layer d0 and a conductive film g1 stacked in this order on the same level on which the source electrode SD1 and the drain electrode SD2 are formed. The video signal line DL is integrated with the drain electrode SD2.

Connecting Electrode SD3, Opening of the Protective Film PSVOP, and Connecting Line ITO Connecting electrodes SD3 are formed as parts of the video signal line DL, and are disposed at both sides of a crossing region where the video signal line and the scanning signal line cross one another. Each of these electrodes contributes to an electrical connection between the video signal line DL and a connecting line ITO of a transparent conductive film (d3), shown in FIG. 3, which is formed later.

The opening PSVOP is a so-called "through-hole" piercing the protective film PSV, and a section thereof is smaller than an upper surface of the connecting electrode SD3. Through the opening PSVOP of the protective film PSV in FIG. 3, the conductive film d1 of the connecting electrode SD3 is electrically connected to conductive film d3 fabricated on the protective film PSV.

Therefore, the video signal line DL consists of a pair of conductive paths, including the conductive film d1 and the conductive film d3 formed on the protective film PSV above the conductive film d1 between the openings of the protective film PSVOP, which openings are formed at both sides of the scanning signal line GL. According to this arrangement, even if the conductive film d1 extending over the scanning signal line GL becomes broken down (disconnected) at a bump owing to a thickness of the scanning signal line, an electrical connection of the video signal line DL can be maintained by the conductive film d3.

Furthermore, the conductive film d3 has a broader width than that of the conductive film d1 at the region where the video signal line DL crosses the scanning signal line GL. More specifically, the conductive film ITO (the conductive film d3 of the connecting line) covers the video signal line DL (the conductive film d1) by disposing the conductive film ITO over the video signal line DL so as to overlap a central axis of the conductive film ITO with that of the video signal line DL and by broadening the line width of the conductive film ITO so that it is wider than that of the video signal line DL. Thus, even if the protective film PSV becomes cracked, the conductive film ITO protects the conductive film d1 from erosion by chemicals (reagent chemicals, solvent, etc.) for etching, cleaning, or else which penetrate into the conductive film d1.

Pixel Electrode PX

The pixel electrode is formed to have the same laminated structure of the $N^+$-type semiconductor layer d0 and conductive films g1 as that of the source electrode SD1 and the drain electrode SD2. In this example, the pixel electrode is integrated with the source electrode SD1.

Storage Capacity Cstg

The pixel electrode is formed so as to overlap with the counter voltage signal line CL at an opposite end thereof relative to another end at which the thin-film transistor TFT is connected thereto. This overlapping of the pixel electrode PX and the counter voltage signal line CL provides the storage capacity (an electrostatic capacitor) Cstg, using the former as one electrode PL2 and the latter as another electrode PL1 which confronts the one electrode PL2. A dielectric film of the storage capacity for spacing these electrodes PL1 and PL2 is formed of the insulating film GI utilized for the gate insulating film of the thin-film transistor TFT.

In a plan view of FIG. 1, the storage capacity Cstg is formed at a region where the conductive film g1 of the counter voltage signal line CL is widened. In this example, the electrode PL1 of the storage capacity Cstg lying on the lower side of the insulating layer GI of the storage capacity is formed of a refractory metal such as Cr so that the storage capacity Cstg is hardly affected by point defects. The point defects are caused due to a short circuit between the electrodes PL1, PL2 according to the materials of the electrode PL1. More specifically, when forming the electrode PL1 out of aluminum, whiskers of Al appearing around the electrode PL1 penetrate the insulating layer GI formed thereon, reach the electrode PL2, and cause the aforementioned short circuit. Such a short circuit caused by the whiskers is also suppressed by the laminated structure of the counter voltage signal lines, which comprises the conductive film g0 of Al and the conductive film g1 of such refractory metals as Cr covering the upper and lateral surfaces of the conductive film g0.

Protective Film PSV

The protective film PSV is formed over the thin-film transistor TFT. The protective film is also called "a passivation film". The protective film PSV is formed mainly for protecting the thin-film transistor TFT from moisture and is formed of a material having high transparency and forming a good vapor barrier. For instance, the protective film PSV is formed of silicon oxide or silicon nitride, which are grown by a plasma CVD (Chemical Vapor Deposition) method to have a thickness of around 1 $\mu$m.

The protective film PSV is removed at the opening thereof so as to expose an upper surface of the connecting electrode in a matrix area (an image-displaying area) of the liquid crystal display panel, where a plurality of the pixels are arranged two-dimensionally. The protective film PSV is also removed so as to expose the terminal areas for connections to respective external circuits GTM and DTM (hereinafter, external connecting terminals) at the peripheries of the liquid crystal display panel.

Externally Connecting Terminals GTM, DTM

Figure 6A:
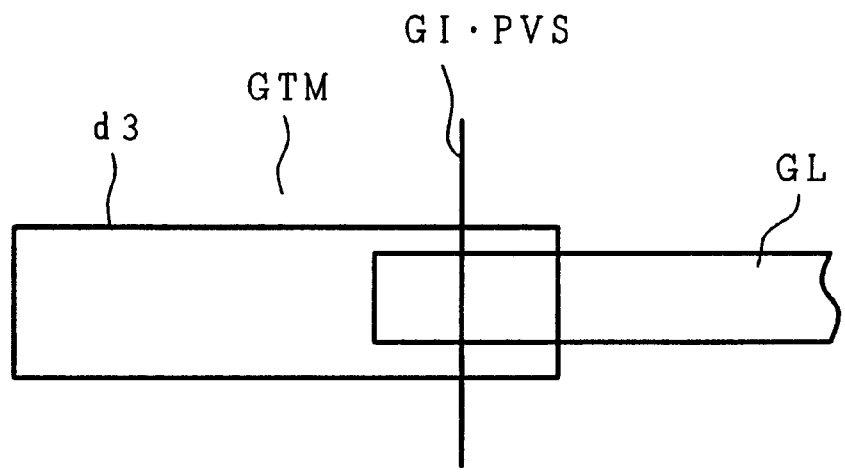
FIGS. 6A and 6B are diagrams of external connecting terminals of the liquid crystal display device according to the present invention.

FIG. 6A is a diagram of the external connecting terminal (called, "a gate terminal") GTM. The external connecting terminal GTM is fabricated by steps of forming the scanning signal line GL, then covering the scanning signal line GL, other than an end area thereof, with the insulating film GI and the protective film PSV in this order, and finally connecting the conductive film d3 of ITO to the scanning signal line GL at the end area (in a left half of FIG. 6A). The conductive film d3 has a first portion formed on an upper surface of the protective film PSV and a second portion formed on an upper surface of the scanning signal line GL exposed at the end area thereof, and is extended continuously from the first portion to the second portion.

Figure 6B:
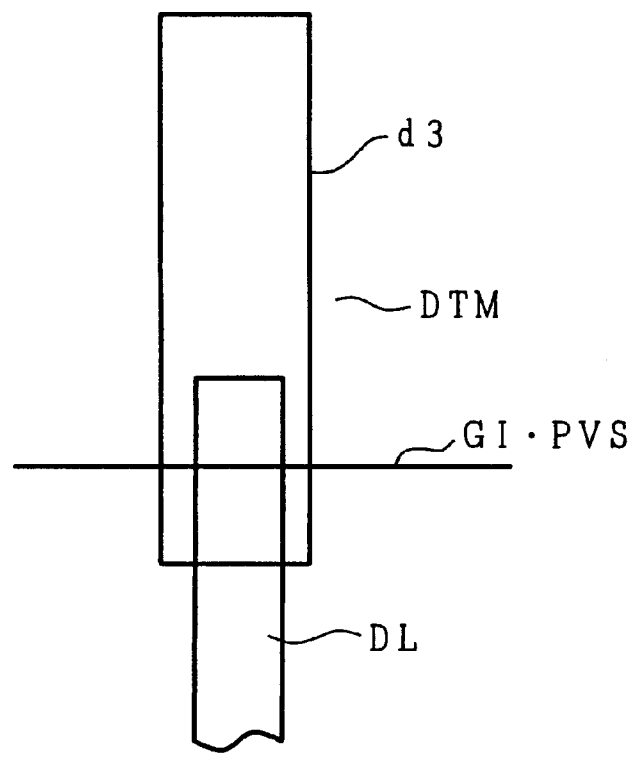

FIG. 6B is a diagram of the external connecting terminal (called "a drain terminal") DTM. The external connecting terminal DTM is fabricated by steps of forming the video signal line GL on the insulating film GI, then covering the video signal line DL, other than an end area thereof, with the protective film PSV, and finally connecting the conductive film d3 of ITO to the video signal line DL at the end area (in an upper half of FIG. 6B). The conductive film d3 has a first portion formed on the upper surface of the protective film PSV and a second portion formed on an upper surface of the video signal line DL exposed at the end area thereof, and is extended continuously from the first portion to the second portion.

The conductive film d3 prevents each of the electric contacts of the external connecting terminals DTM, GTM from being damaged by corrosion, etc.

Transparent Electrodes ITO

The transparent electrode ITO is formed of the conductive film d3 after the protective film PSV is formed. The transparent electrode is fabricated along (preferably, parallel to) the video signal line DL and is wider in line width than the video signal line DL at the crossing portion of the video signal line DL and the scanning signal line GL in the matrix area (being utilized for "a screen" of a product).

In this example, the conductive film d3 at the crossing portion in the matrix area is formed by the same process and of the same material as those of the conductive films d3 formed at the external connecting terminals DTM and GTM.

Fabrication Processes

Fabrication processes for the above-mentioned structures on the substrate SUB1 of the liquid crystal display device will be explained hereinafter by referring to FIGS. 7A–7G. In the respective drawings, a designation in parenthesis indicated at the center portion of a figure is an abbreviation of the element formed in the process step. In each figure, the left half thereof shows a cross section of the thin-film transistor TFT taken along the line 4—4 in FIG. 1, and the right half thereof shows a cross section of the crossing portion of the scanning signal line GL (the gate electrode GT in the pixel) and the video signal line DL taken along the line 3—3 in FIG. 1. The process steps A–G, other than the process step C, are classified with respect to optical lithographic processes (photolithography treatments) and each cross sectional drawing of the processes illustrates an image after completion of the sequence including the optical lithographic process, a fabrication of the device structure(s), and a removal of a photoresist in this order. The optical lithographic process in this specification is defined as a sequence of steps, including coating a photoresist on a substrate (to be fabricated) e.g. by spinning the substrate, baking the photoresist applied on the substrate (i.e. a prebaking processing), exposing the photoresist to light passing through a mask (a photomask), baking the photoresist (i.e. a postbaking processing), developing the photoresist, removing parts of the photoresist using a release agent (patterning the photoresist according to an opening pattern of the mask), and cleaning a surface of the substrate to be fabricated. Further explanations will be provided according to the processes classified as follows.

Figure 7A:
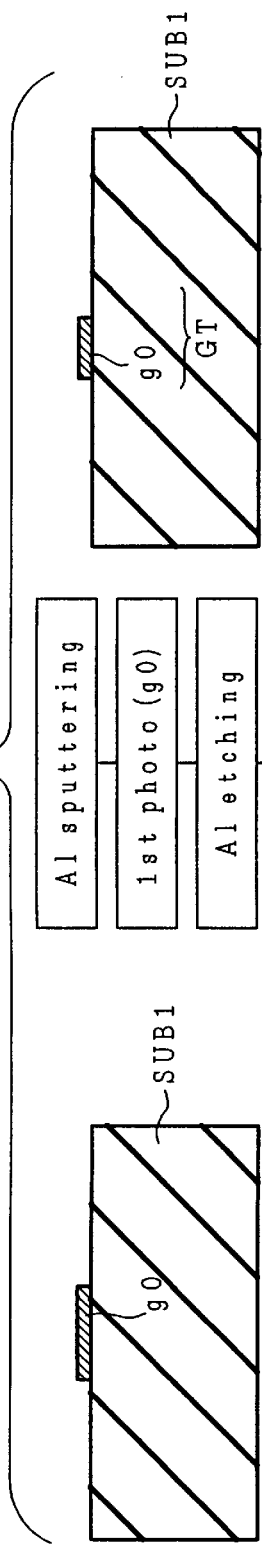

Process (A)—FIG. 7A

A conductive film g0 of 1000 Å in thickness is formed on a lower transparent glass substrate SUB1 of type AN635 glass (Asahi Glass Co. Ltd.). Material of Al—Pd, Al—Si, Al—Ta, Al—Ti—Ta, or etc. being formed by a sputtering process is utilized for the conductive film g0. After a first optical lithographic processing (1st photo), the conductive film g0 is selectively etched by mixed a solvent of phosphoric acid ($H_3PO_4$), nitric acid ($HNO_3$), and glacial acetic acid ($CH_3COOH$) with respect to a photoresist pattern formed thereon during the first optical lithographic processing, and the conductive film g0 is fabricated into scanning signal lines GL and counter voltage signal lines CL.

Figure 7B:
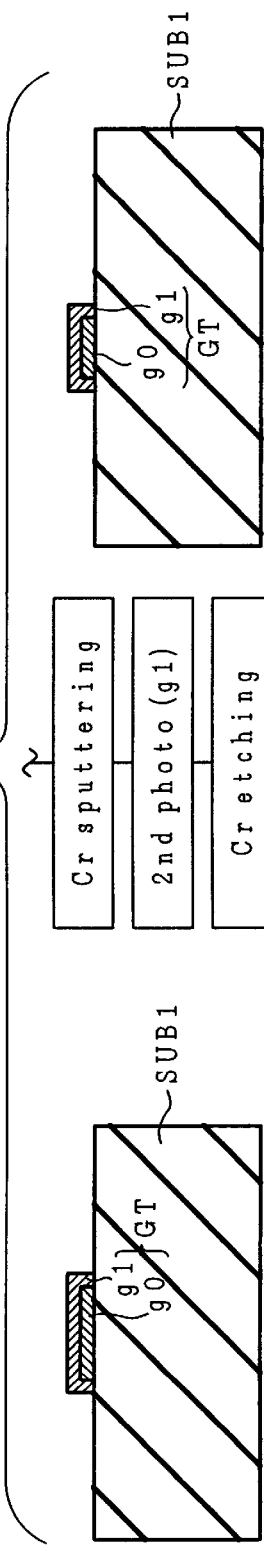

Process (B)—FIG. 7B

A conductive film g1 of chromium (Cr) of 2000 Å in thickness is formed by a sputtering method. After a second optical lithographic processing (2nd photo), the conductive film g1 is fabricated into the scanning signal lines GL, the counter voltage signal lines CL, and counter electrodes CT by a selective etching with respect to a photoresist pattern which is formed on the conductive film g1 during the second optical lithographic processing. While a chromium film is utilized for the conductive film g1 in this example, other refractory materials (Mo, Ti, Ta, W, etc.) or alloys thereof may be utilized for the conductive film g1 as well.

Figure 7C:
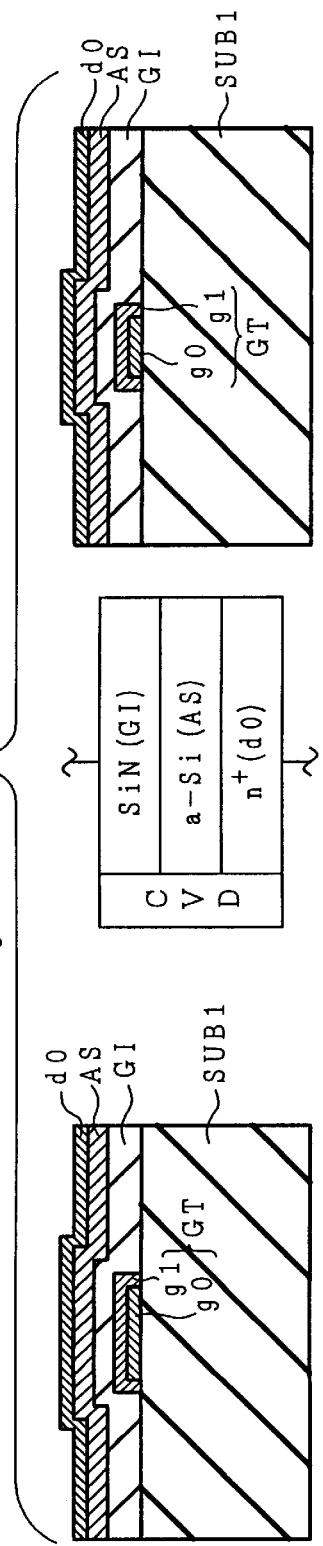

Process (C)—FIG. 7C

By introducing ammonia gas ($NH_3$), silane gas (silicon hydride $Si_nH_{2n+2}$) and nitrogen gas ($N_2$) into a plasma CVD apparatus (a chamber for plasma chemical vapor deposition) in which the lower transparent glass substrate SUB1 after the process (B) is contained, a silicon nitride film of 2000 Å is formed on an upper surface of the lower transparent glass substrate SUB1. Then, an i-type amorphous silicon layer (a-Si layer) is formed by introducing silane gas ($Si_nH_{2n+2}$) and hydrogen gas ($H_2$) into the plasma CVD apparatus, and finally a $N^+$-type amorphous silicon layer is formed by introducing hydrogen gas ($H_2$) and phosphine (hydrogen phosphide $PH_3$) into the plasma CVD apparatus.

Figure 7D:
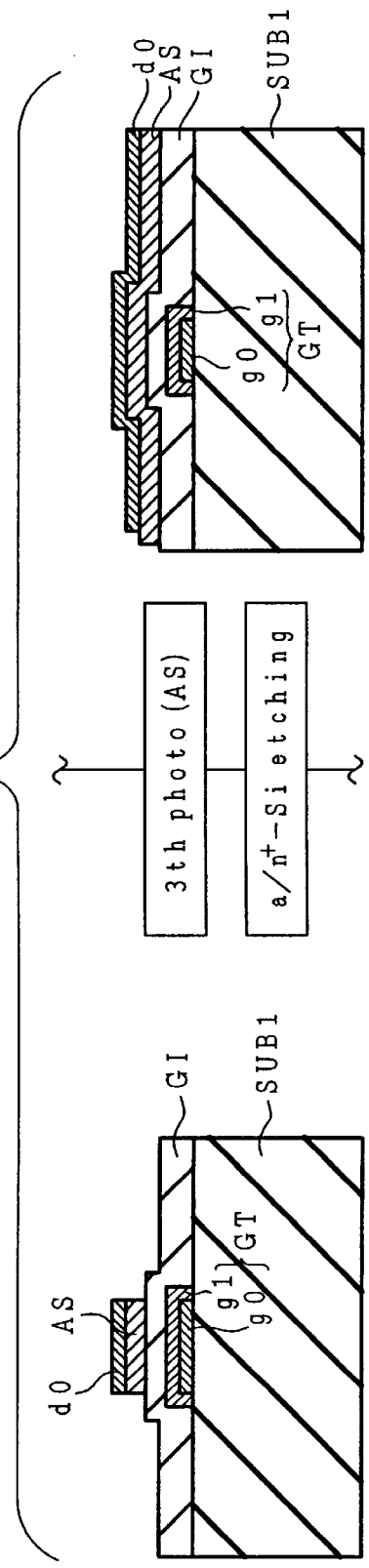

Process (D)—FIG. 7D

After a third optical lithographic processing (3rd photo), the $N^+$-type amorphous silicon layer and the i-type amorphous silicon layer is etched by a dry process using sulfur hexafluoride ($SF_6$) and carbon tetrachloride (tetrachloromethane $CCl_4$) for etching gas. The amorphous silicon layers AS and d0 are etched with respect to a photoresist pattern which is formed on the $N^+$-type amorphous silicon layer during the third optical lithographic processing, and consequently islands of i-type semiconductor layers AS are formed.

Figure 7E:
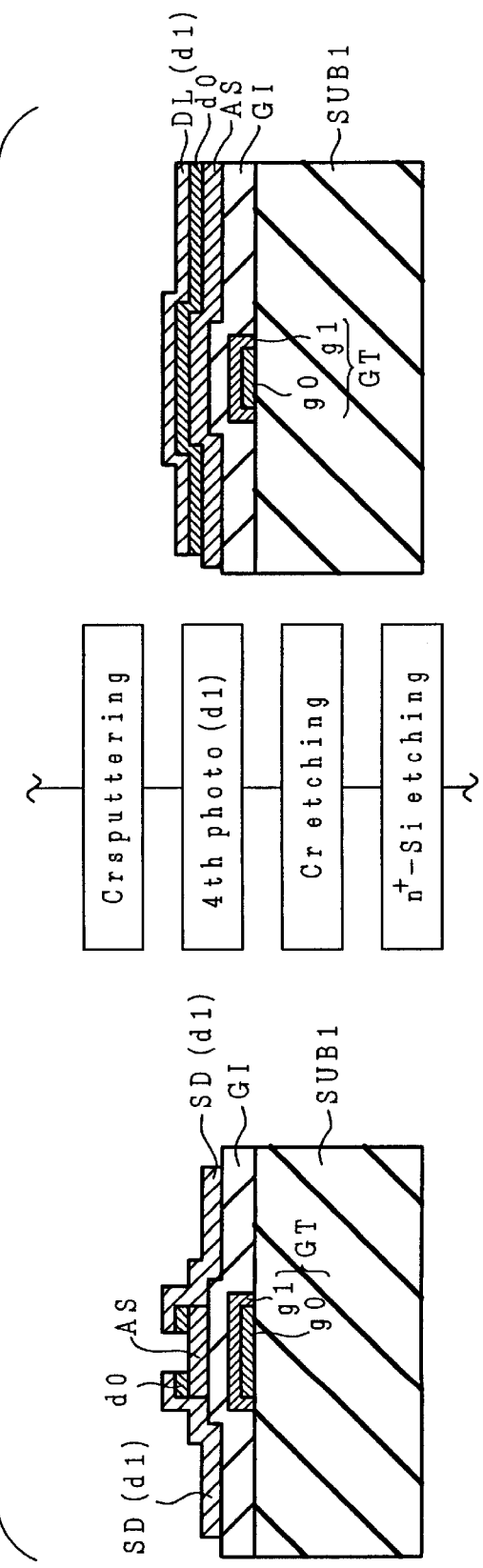

Process (E)—FIG. 7E

A conductive film d1 of Cr of 3000 Å in thickness is formed by a sputtering method. After a fourth optical lithographic processing (4th photo), the conductive film d1 is etched in a similar manner (wet process) to that used for the process B, and is fabricated into video signal lines DL, source electrodes SD1, drain electrodes SD2, and pixel electrodes PX. Then, the $N^+$-type amorphous silicon layer is etched by introducing sulfur hexafluoride ($SF_6$) and carbon tetrachloride ($CCl_4$) into an etching apparatus in which the lower transparent glass substrate SUB1 is contained, and the $N^+$-type semiconductor layer d0 lying between the source electrode SD1 and the drain electrode SD2 in every pixel is removed selectively according to a photoresist pattern which is formed on the conductive film d1 during the fourth optical lithographic processing.

Process (F)—FIG. 7F

By introducing ammonia gas ($NH_3$), silane gas ($Si_nH_{2n+2}$), and nitrogen gas ($N_2$) into a plasma CVD apparatus in which the lower transparent glass substrate SUB1 after the process (E) is contained, a silicon nitride film of 1 μm is formed. After a fifth optical lithographic processing (5th photo), the silicon nitride film d1 is etched by a photolithography technique using sulfur hexafluoride ($SF_6$) for dry etching gas selectively with respect to a photoresist pattern which is formed on the silicon nitride film d1 during the fifth optical lithographic processing, and is fabricated into a protective film PSV1.

Process (G)—FIG. 7G

A transparent conductive film d3 of ITO (Indium-Tin-Oxide) of 1400 Å in thickness is formed by a sputtering method. After a sixth optical lithographic processing (6th photo), the transparent conductive film d3 is etched by a mixed solvent of hydrochloric acid (HCl) and nitric acid ($HNO_3$) selectively with respect to a photoresist pattern which is formed on the transparent conductive film d3 during the sixth optical lithographic processing, and is fabricated into the conductive film ITO at the crossing portion of the video signal lines DL and the scanning signal line GL in a matrix area of a liquid crystal display panel, gate terminals GTM and drain terminals DTM in a periphery of the liquid crystal display panel.

All of the fabrications at the side of the substrate SUB1 of the liquid crystal display device according to the present invention are completed by the process (G).

In the example mentioned above, the present invention has been explained with reference to a liquid crystal display device of the so-called lateral electric field type. However, the present invention should not be limited to such an application as the example mentioned above, but may be applied to other kinds of liquid crystal display device, like those of the vertical electric field type also.

Because the portion where the video signal line crosses the scanning signal line also appears in liquid crystal display devices other than that of the lateral electric field type, the same problem as mentioned above will arise.

As apparent from the foregoing explanation, the present invention provides a preferable panel structure for a liquid crystal display device to keep the yield factor for production thereof high by preventing signal lines in the panel from being broken.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
   a pair of substrates confronting one another and being spaced by a liquid crystal layer sealed therebetween; and at least one first signal line, a first insulating film, at least one second signal line, and a second insulating film formed above a surface of one of the pair of the substrates which confronts the liquid crystal layer;

wherein the at least one first signal line extends along a first direction, the at least one second signal line extends along a second direction transverse to the first direction and crosses over the at least one first signal line at a crossing region, where the at least one first signal line, the first insulating film, the at least one second signal line, and the second insulating film are disposed in this order from the surface of the one of the pair of the substrates, the second insulating film has a pair of openings piercing therethrough and a conductive layer formed thereon, the pair of openings are formed at both sides of the crossing region, and the conductive layer crosses over the at least one first signal line and is electrically connected to the at least one second signal line via the pair of openings at both sides of the crossing region.

2. The liquid crystal display device according to claim 1, wherein the conductive layer is formed of Indium-Tin-Oxide.

3. The liquid crystal display device according to claim 1, further comprising a terminal for supplying a signal to one of the at least one first signal line and the at least one second signal line, wherein both the terminal and the conductive layer are formed of Indium-Tin-Oxide.

4. The liquid crystal display device according to claim 3, wherein both the terminal and the conductive layer are formed by the same process.

5. The liquid crystal display device according to claim 1, wherein the conductive layer has a broader width than that of the at least one second signal line.

6. The liquid crystal display device according to claim 5, wherein a central axis of the conductive layer extending along the second direction and that of the at least one second signal line substantially coincide with one another.

7. The liquid crystal display device according to claim 1, wherein the at least one second signal line is covered by the conductive layer on at least a portion thereof between the pair of openings.

8. The liquid crystal display device according to claim 7, wherein the portion of the at least one second signal line is extended across the at least one first signal line.

* * * * *